United States Patent

[11] 3,547,250

| | | | |
|---|---|---|---|
| [72] | Inventor | Hendrikus Gerhardus Muller Hengelo, Netherlands | |
| [21] | Appl. No. | 807,315 | |
| [22] | Filed | March 14, 1969 | |
| [45] | Patented | Dec. 15, 1970 | |
| [73] | Assignee | N. V. Machinefabriek B & S Bedrijven v.d. Woerdt Hengelo, Netherlands | |
| [32] | Priority | March 14, 1968 | |
| [33] | | Netherlands | |
| [31] | | No. 6803634 | |

[54] ROTARY ARTICLE TRANSFER DEVICE
6 Claims, 3 Drawing Figs.

[52] U.S. Cl. ..................................................... 198/30;
17/71: 198/33
[51] Int. Cl. ...................................................... A22c 29/00;
B65g 47/24, B65g 47/26

[50] Field of Search ............................................. 198/25, 30,
33(R1); 17/71

[56] References Cited
UNITED STATES PATENTS
2,491,778  12/1949  Smith .......................... 198/30X

*Primary Examiner*—Edward A. Sroka
*Attorney*—Young & Thompson

ABSTRACT: A rotary article transfer device rotates about a horizontal axis to move articles along and off a circularly curved supporting surface. The device shoves all articles but one off an edge of the supporting surface, shoves the one article back toward the center, grasps and moves the one article along the remainder of the curved surface and then ejects it beyond the end of the curved surface.

3,547,250

INVENTOR
HENDRIKUS GERHARDUS MULLER

ROTARY ARTICLE TRANSFER DEVICE

The present invention relates to rotary article transfer devices, more particularly of the type in which a conveyor rotatable about a horizontal axis arranges articles from among a surplus of articles in a single series of appropriately spaced articles. The invention is particularly well adapted for the handling of shrimps and will be described and illustrated in connection with this use.

It is an object of the present invention to provide a rotary article transfer device which segregates and delivers single articles from among a plurality of relatively randomly disposed articles, in predetermined timed relationship.

Another object of the present invention is the provision of a rotary article transfer device which separates cohering articles from each other and conveys one article while returning the others.

Finally, it is an object of the present invention to provide a rotary transfer device which will be relatively simple and inexpensive to manufacture, easy to install, operate, maintain and repair, rapid in operation, and rugged and durable in use.

Other objects and advantages of the present invention will become apparent from a consideration of the following description, taken in connection with the accompanying drawings, in which.

Figure 1:
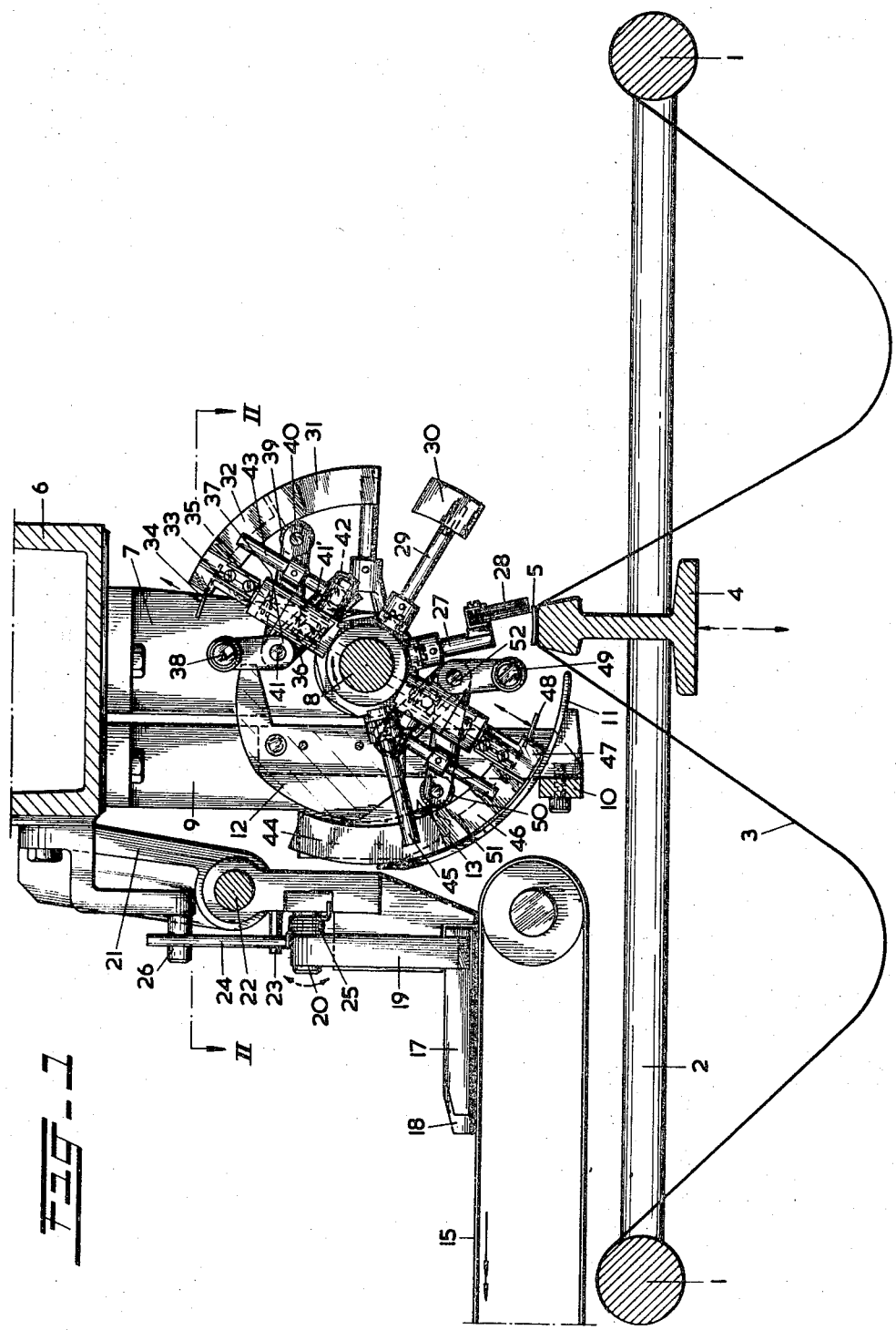
FIG. 1 is a side-elevational view, with parts in cross section, of a rotary article transfer device according to the present invention.

Referring now to the drawings in greater detail, it should first be remarked that in all of the FIG., the movements which take place continuously in one direction are indicated by a double arrow, while the reciprocating movements are indicated by a full arrow in the direction of the working stroke and an arrow in broken lines in the return direction.

Referring first to FIG. 1, there is shown at the bottom of that FIG. an oscillating feed device for presenting articles to the rotary article transfer device of the present invention. The feed device comprises a frame having side bars 1 and end bars 2 which define the upper rim of a hopper whose bottom is a flexible sheet 3 preferably of net material, in which a quantity of articles such as shrimps are disposed in a randomly oriented mass. A beam 4, elongated in a direction perpendicular to the plane of the sheet bearing FIG. 1, carries on its upper surface an elongated plate 5 whose transverse cross section is upwardly concave and which is secured to beam 4 with sheet 3 between plate 5 and beam 4.

Upon vertical reciprocatory movement of beam 4, plate 5 moves first upwardly from a lowermost position in which shrimps tumble onto the upper surface of plate 5 to the raised position of FIG. 1 in which only one or a few shrimps will remain on plate 5, the rest tumbling down into the moat about the raised central portion of sheet 3. The rotary article transfer device of the present invention sweeps the shrimps off plate 5, which for this purpose dwells for a predetermined period in its uppermost position shown in FIG. 1, whereupon beam 4 and plate 5 then descent again until they are adjacent their lowermost possible position, whereupon shrimps tumble back down onto plate 5 to renew the supply of shrimps on top of plate 5, after which plate 5 can rise again, and so on. The structure and operation of one embodiment of this feed device are shown in greater detail in the copending application of the same inventorship, filed under even date herewith, and entitled "Apparatus for Isolating Articles From a Supply."

The rotary article transfer device of the present invention comprises a supporting frame beam 6 from which depend brackets 7 which in turn provide bearings for a rotary horizontal shaft 8. Shaft 8 is driven continuously and synchronously with the oscillatory movement of beam 4 by conventional transmission gearing (not shown) as also explained in the above-identified application.

Brackets 9 are also secured to beam 6; and at the lower end of brackets 9 bolts 10 secure a circularly curved guiding plate 11 concentric with shaft 8. Cams 12 and 13, providing fixed curved cam surfaces, are also secured to brackets 9.

Plate 11 extends along about a quarter of a circle, from adjacent the raised position of beam 4 and a substantial distance below the upper surface of plate 5, to a point 14 which is located above the end of a belt conveyor 15 which receives and transports the individual shrimps which are discharged in timed relationship from the rotary transfer device and which conveys them to other devices such as orienting or shelling devices or the like. Between point 14 and conveyor 15, however, the shrimps pass through an inclined chute 16 and between two vertical plates 17 and 18 that extend lengthwise of belt 15. Plates 17 and 18 and chute 16 are carried by a horizontal shaft 22 which is reciprocated by conventional means (not shown) over a short distance to jiggle the chute and the plates. In the case of shrimps, this jiggling movement orients the shrimps so that either the head or the tail or the curved back is foremost. Plate 17, in turn, is mounted for limited horizontal swinging movement about an axis parallel to conveyor 15, on an arm 19 mounted on a pin 20 which is carried by shaft 22. A stop pin 23 also carried by shaft 22 is engaged by an extension 24 of arm 19, the extension 24 being urged against pin 23 by a torsion spring 25. Extension 24 also abuts against a fixed stop 26 carried by beam 6, so that when shaft 22 reciprocates axially, plate 17 is moved toward and away from plate 18.

A plurality of devices for acting simultaneously or successively on the shrimps are mounted on and peripherally spaced apart about shaft 8. A radially-extending arm 27 carried by shaft 8 carries a brush 28 at its outer end, which moves over plate 5 in the highest position of plate 5, to sweep shrimps off plate 5 onto the lower end of plate 11. The brush can be wide enough to sweep off only the desired number of shrimps, or it can be wider in order to sweep off an excess of shrimps to ensure that the desired number will always be available, the surplus being returned to the subjacent hopper as will appear later. At this point, it should be noted that the radial extent of brush 28 is great enough to clean plate 5, but not great enough to advance the shrimps along plate 11. Thus, brush 28 functions only to feed shrimps to plate 11, and then passes on over them.

The first device to contact the shrimps deposited on plate 11 is a spreading member 30 carried by a radially disposed shaft 29 secured to shaft 8. At this point, it should be noted that as spreading member 30 extends radially far enough out to contact the shrimps on plate 11, it would interfere with plate 5 and beam 4 had these latter not previously descended. Thus, as explained above, the oscillatory movement of plate 5 and beam 4 is synchronized with that of shaft 8 so that plate 5 dwells in its uppermost position only somewhat before and during the passage of brush 28 thereover. Spreading member 30 is V-shaped, like a plow, and will therefore divide the shrimps on plate 11 into two groups and will shift one group to the left and the other group to the right on plate 11. Moreover, spreader 30 shifts the shrimps so far that there is room at each edge of plate 11 only for a single line of shrimps. Shrimps in excess of those needed to form a single file at each edge of plate 11 will simply fall back into the subjacent hopper.

Spreading member 30 is followed (proceeding counterclockwise about FIG. 1) by a slide 31 which sweeps along and across only one edge of plate 11 and is directed inward toward the center of the plate, thereby to direct toward the center of the plate only one of the lines of shrimp disposed along each edge of plate 11. After slide 31 has passed, plate 11 can have two lines of shrimp on it: one at one extreme edge of plate 11, and the other disposed centrally of plate 11.

Next comes a funnel 32, which directs the centrally disposed line of shrimps into a catching member 33 which, however, has room only for one shrimp in it. Any other shrimp in the centrally disposed shrimps will remain in funnel 32.

If there are no other shrimps ahead of it in the central region of plate 11, then this single shrimp in the catching member 33 can be moved by the member 33 along the rest of plate 11 and as far as point 14, whereupon the shrimp can leave catching member 33 and drop into the chute 16. In order to make sure that the shrimp does in fact leave the catching member 33 and does not become wedged in it and carried about again through another rotation of the rotary transfer device, an ejector 34 is provided, in the form of a plate which is fixed to a radially movable bar 35 engaged by a fork 36 controlled by an arm 37 that has a roller 38 that rolls on the arcuate cam surface of cam 13 in such a way that when member 33 passes the end point 14 of plate 11, roller 38 is moved by the cam surface and moves plate 34 radially outwardly to eject the shrimp. The cam and roller and arm control of ejector 34 are merely conventional and need not be described in greater detail.

If more than one shrimp is in the central portion, or if the antennae of two shrimps have become entangled, then there will be a shrimp in funnel 32 in addition to the shrimp in catching member 33. To remove the extra shrimp before the discharge point 14 is reached, funnel 32 is swung sideways to separate the extra shrimp from the properly positioned shrimp and to return the extra shrimp to the hopper. To do this, a roller 39 bears on the cam surface of cam 12. Roller 39 is supported by arm 40 which in turn is supported by transverse shaft 40' which is coaxial with transverse shaft 41 of the arm 37 that bears roller 38, and acts on the arm 41' through pin 42 of the rotatably supported member on which arm 43 of the funnel 32 is carried. Again, any suitable arm and cam mechanism could be used for this purpose, as those skilled in this art well understand.

Figure 2:
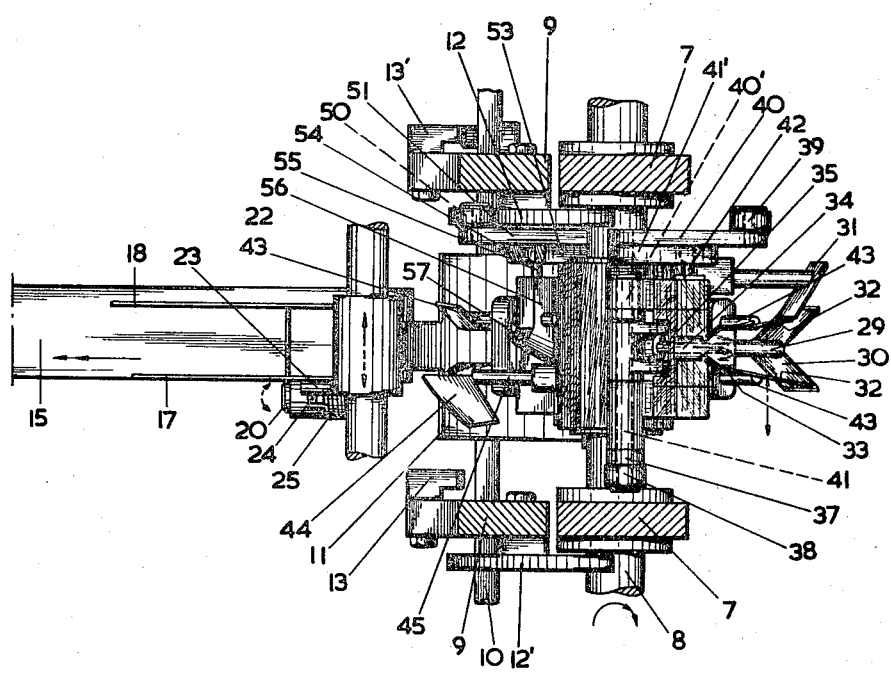
FIG. 2 is a plan view of the device of FIG. 1, taken on line II–II of FIG. 1.

So much for the shrimp that was disposed at one edge of plate 11. But it will be remembered that there may have been a shrimp or several shrimps on the opposite edge of plate 11. To deal with such other shrimp, a second slide 44 is provided, which is farther about shaft 8 in a counterclockwise direction and is carried by a radial shaft 45 rigid with shaft 8. However, slide 44 is reversely inclined as compared to slide 31, as is perhaps best seen in FIG. 3. Slide 44 directs the shrimp or shrimps from this other edge of plate 11 centrally into the path of a funnel 46 and a second catching member 47 with an ejector 48 controlled by a roller 49, the lateral swinging of the funnel 46 being controlled by a roller 50. The same or similar mechanism can be used to operate the funnel 46 and ejector 48 as in the case of funnel 32 and ejector 34. Suffice it to say that the roller 50 is secured to an arm 51 which is pivotally mounted at 52 and controls an arm 53 seen in FIG. 2, which corresponds to the arm 41'. Arm 53 engages by means of a fork-shaped portion 54 with a pin 55 of a member 56 rotatably supported on an inclined pin 57 (FIG. 2) about which the funnel 46 is laterally swung.

Figure 3:
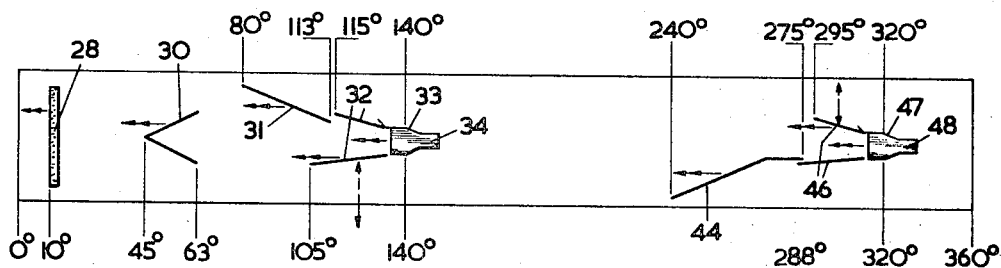
FIG. 3 is a diagrammatic development, on a flat surface, of the various sequentially operative members carried by the rotor shown in FIGS. 1 and 2.

The operation is evident from the above and can be seen from FIG. 3, in which the various positions of the devices are indicated with the number of degrees of angular displacement between them. Thus, the brush 28 is followed by a spreading member 30 by which the shrimps are pushed to opposite side edges of plate 11, the slide 31 first returning the shrimp at one edge to a central portion where the funnel 32 directs it to the catching member 33. On the other side edge of plate 11, the slide 44 directs the shrimp centrally to funnel 46 and thence to catching member 47. The lateral movement of funnel 32 or 46 separates surplus and unwanted shrimp from the central position to the side; and it will be noted in FIG. 2 that plate 11 narrows abruptly on each side of its central portion at the location where the funnel swings laterally, so that the deflected surplus shrimps fall back into the hopper. See also FIG. 1 in this regard, in which the division between the broad and narrow portions of plate 11 is shown about midway of the length of plate 11.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in the art will readily understand. Such modifications and variations are considered to be within the purview and scope of the present invention as defined by the appended claims.

I claim:

1. A rotary article transfer device comprising a rotor rotatable about a horizontal axis, means for feeding articles to the rotor, a stationary support for articles received by the rotor, said support having a surface concentric with the rotor, an inclined slide carried by said rotor to push articles toward a side of the supporting surface and to discharge extra articles off the edge at that side of the supporting surface, another slide carried by said rotor and oppositely inclined from the first slide to push remaining articles from said edge toward the central portion of the supporting surface, and a catching member carried by said rotor to move a centrally located article along and off the end of the remainder of the supporting surface.

2. A device as claimed in claim 1, said first slide being V-shaped to divide and direct articles toward both side edges of the supporting surface, there being a said oppositely inclined slide and catching member for articles along one side edge of the supporting surface, followed by another said oppositely inclined slide and catching member for articles disposed along the other side edge of the supporting surface.

3. A device as claimed in claim 1, and oscillating means for feeding articles to the rotor, the rotor including a member that removes articles from said feed means, said feed means presenting articles at a distance radially inwardly from said supporting surface and said removing means terminating a substantial distance short of said supporting surface so that said removing means feeds articles to said supporting surface but then passes over the articles.

4. A device as claimed in claim 1, and a funnel carried by said rotor in advance of said catching member to direct articles toward the catching member, the catching member being adapted to receive only a single said article, and means for swinging the funnel laterally of the path of the catching member so as to discharge from said surface articles in excess of said single article.

5. A device as claimed in claim 4, said supporting surface being narrower adjacent said discharge point than adjacent the portion of the supporting surface that first receives the articles, thereby to discharge articles in excess of said single article.

6. A device as claimed in claim 1, and an ejector carried by said rotor for positively ejecting articles from said catching member, and means for moving said ejector radially relative to said catching member.